March 3, 1953   F. M. GUY   2,629,991
COUPLING
Filed Aug. 1, 1950
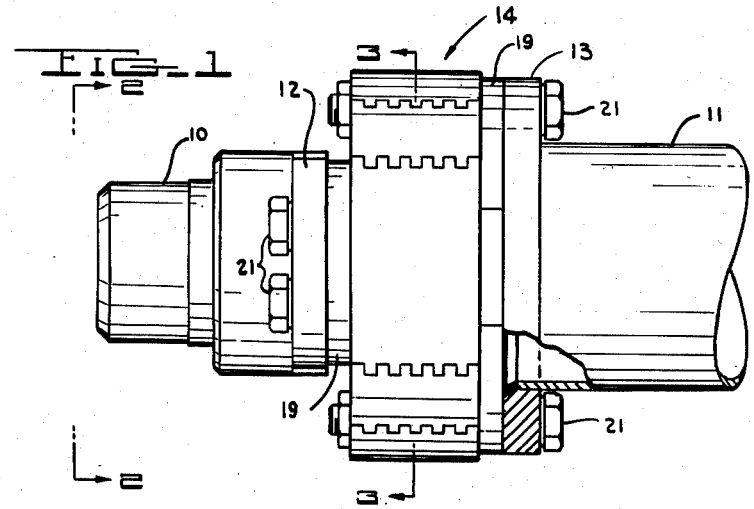
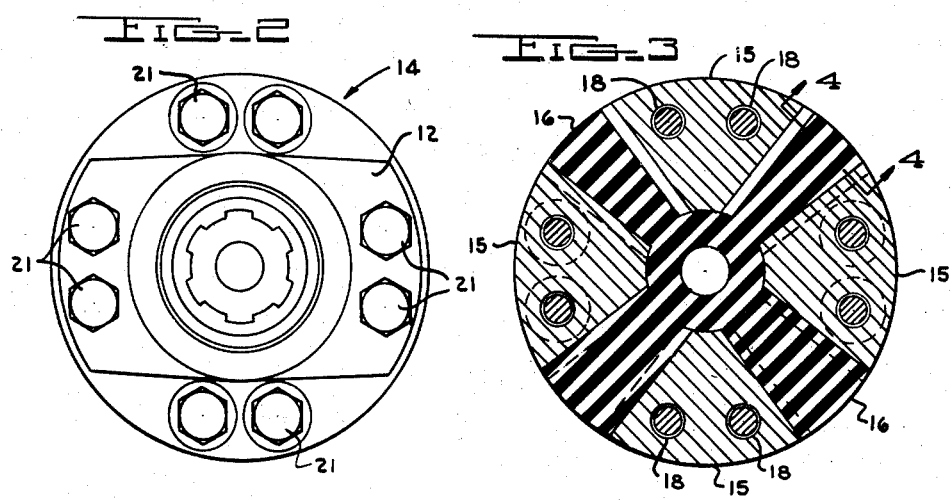
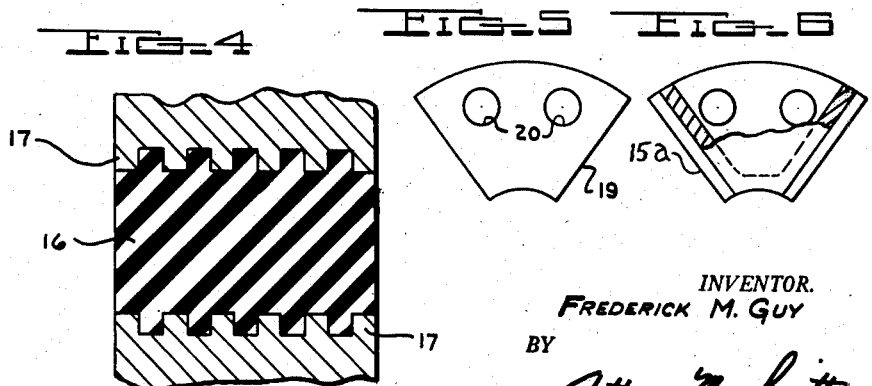
INVENTOR.
FREDERICK M. GUY
BY
Arthur M. Smith
ATTORNEY Patented Mar. 3, 1953

2,629,991

UNITED STATES PATENT OFFICE 2,629,991

COUPLING

Frederick M. Guy, Detroit, Mich., assignor to U. S. Universal Joints Company, Detroit, Mich., a corporation of Michigan Application August 1, 1950, Serial No. 177,095

3 Claims. (Cl. 64—14)

The present invention relates to a coupling adapted for connecting a driving and a driven member, and particularly to such a coupling which will accommodate universal displacement between the driving and driven member. The present invention is an improvement on my Patent No. 2,213,277 issued September 3, 1940.

It is desirable to make universal couplings compact and light so that they may be adapted for a wide variety of uses. In order to do this, it has been found advantageous to provide a plurality of metal segments separated by a resilient body as set forth in my prior patent referred to above. Such a construction must be very sturdy in view of the uses to which it is subjected.

Therefore, it is a primary object of the present invention to provide a universal coupling which is compact and light and which will permit maximum freedom of the resilient elements therein.

It is a further object of the present invention to provide a universal coupling including separate metallic elements with a resilient body disposed therebetween, wherein the resilient body is strongly secured to the metallic elements.

It is another object of the present invention to provide a resilient universal coupling which is easy to assemble, service, repair and install.

It is another object of the present invention to provide a resilient coupling which is simple in construction and which is readily adapted to mass production methods of economical manufacture, the construction utilizing a relatively small number of parts.

Other objects of this invention will appear in the following description and appended claims, reference being had to the accompanying drawings forming a part of this specification wherein like reference characters designate corresponding parts in the several views.

In the drawings:

Fig. 1 is a side view of a universal coupling embodying the present invention with a portion broken away to reveal internal construction.

Fig. 2 is an end view taken along the line 2—2 in the direction of the arrows, Fig. 1.

Fig. 3 is a sectional elevation taken along the line 3—3 in the direction of the arrows, Fig. 1.

Fig. 4 is a fragmentary sectional view taken along the line 4—4 in the direction of the arrows, Fig. 3.

Fig. 5 is a side elevation of the separators embodied in the universal coupling of the present invention.

Fig. 6 is an end elevation of a modified form of segment for use in a coupling embodying the present invention, a portion of the face being broken away to disclose the hollow interior.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The drawings disclose a particular embodiment of the present invention wherein a driving shaft is indicated by the number 10 and a driven shaft is indicated by the number 11. Flanges 12 and 13 are provided on the shafts 10 and 11 respectively. A central cylindrical body portion 14 is composed of four cylindrical segments 15 and a resilient member 16 disposed between said individual segments 15. Each individual segment 15 is provided at its sides with teeth 17 and with a pair of holes 18. The segments 15 are preferably formed of aluminum or some such light metal and may be cored out to provide a hollow segment such as the segment 15a shown in Fig. 6 of the drawings, to further eliminate weight from the device. The central part of the body portion 14 comprises the resilient body member 16. The resilient material is bonded to the segments 15, and the teeth 17 add to the bonding surfaces of the metal and provide an interlocking connection between the segments 15 and the resilient body 16 which strengthens the bond and lessens the danger of the resilient body 16 breaking loose from the segments 15. A pair of rigid spacers 19 having substantially the same contour as the segments 15 are disposed between the flange 12 and one pair of said segments 15. Another pair of spacers 19 are disposed between the flange 13 and a different pair of segments 15. By this construction, the resilient material 16 is free to expand outwardly. The spacers 19 are provided with the holes 20, and when the coupling is assembled, bolts 21 extend through holes in each of the flanges 12 or 13 and through aligned holes 20 in the adjacent spacer and holes 18 in the segment 15 adjacent the spacer.

Thus, it will be seen that when the coupling is assembled, the shafts 10 and 11 may be displaced universally with respect to each other and such displacement will be accommodated by the resilient body 16. The spacers 19 allow free flow of the resilient material of the body 16, and the toothed construction of the segments 15 provide a strong interlocking bond.

Having thus described my invention, I claim:

1. A universal coupling adapted to connect a driving and a driven shaft and comprising two spaced flanges disposed in substantially parallel planes attached one to the adjacent end of each of said shafts, a plurality of spacers in the form of segments of a cylinder disposed some against each of said flanges, a plurality of hollow driving members having substantially the same configuration as said spacers disposed one flush against each of said spacers, fastening means for fastening each respective flange, spacer, and driving member together in a manner which will permit quick and easy disassembly, an integral resilient body disposed at the axis of said driving members and extending into the spaces between said driving members, toothed portions formed along each side of said driving members to provide a bonding surface for said resilient body, said resilient body and driving members forming a solid cylinder having substantially parallel flat end surfaces.

2. A universal coupling adapted to connect a driving and a driven shaft and comprising two spaced flanges disposed in substantially parallel planes attached one to the adjacent end of each of said shafts, a plurality of spacers each in the form of a segment of a cylinder radially disposed between said flanges, some of said spacers being in engagement with each of said flanges, a plurality of spaced apart driving members having substantially the same configuration as said spacers disposed one flush against each of said spacers, means for fastening each respective flange, spacer, and driving member together in a manner which will permit quick and easy disassembly, and an integral resilient body disposed at the axis of said driving member and extending into the spaces between said driving members.

3. A universal coupling adapted to connect a driving and a driven shaft and comprising two spaced flanges disposed in substantially parallel planes attached one to the adjacent end of each of said shafts, a plurality of spacers each in the form of a segment of a cylinder radially disposed between said flanges, some of said spacers being in engagement with each of said flanges, a plurality of spaced apart driving members having substantially the same configuration as said spacers disposed one flush against each of said spacers, toothed portions formed along each side of said driving members, means for fastening each respective flange, spacer, and driving member together in a manner which will permit quick and easy disassembly, and an integral resilient body disposed at the axis of said driving member and having portions extending into the spaces between said driving members, said portions conforming in size and shape to said spaces.

FREDERICK M. GUY.

REFERENCES CITED

The following references are of record in the file of this patent:

UNITED STATES PATENTS

| Number | Name | Date |
|---|---|---|
| 2,208,314 | Snyder | July 16, 1940 |
| 2,213,277 | Guy | Sept. 3, 1940 |
| 2,270,140 | Piron | Jan. 13, 1942 |